United States Patent
Pantela et al.

(10) Patent No.: US 11,010,367 B2
(45) Date of Patent: May 18, 2021

(54) PARALLEL BATCH METADATA TRANSFER UPDATE PROCESS WITHIN SHARDED COLUMNAR DATABASE SYSTEM

(71) Applicant: Micro Focus LLC, Sanford, NC (US)

(72) Inventors: Styliani Pantela, Cambridge, MA (US); Shreya Prasad, Cambridge, MA (US); Ryan Roelke, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 161 days.

(21) Appl. No.: 16/534,652

(22) Filed: Aug. 7, 2019

(65) Prior Publication Data

US 2021/0042288 A1    Feb. 11, 2021

(51) Int. Cl.
*G06F 16/23*    (2019.01)
*G06F 16/28*    (2019.01)
*G06F 16/22*    (2019.01)
*G06F 16/27*    (2019.01)

(52) U.S. Cl.
CPC ........ *G06F 16/2365* (2019.01); *G06F 16/221* (2019.01); *G06F 16/2379* (2019.01); *G06F 16/278* (2019.01); *G06F 16/285* (2019.01)

(58) Field of Classification Search
CPC ............... G06F 16/2365; G06F 16/221; G06F 16/2379; G06F 16/285; G06F 16/278
USPC ........................................................ 707/691
See application file for complete search history.

(56) References Cited

U.S. PATENT DOCUMENTS

| 9,460,147 | B1 | 10/2016 | Chang et al. |
| 10,133,761 | B2* | 11/2018 | Jarvis .................. G06F 16/2246 |
| 10,712,942 | B2* | 7/2020 | Gold ..................... G06F 3/0688 |
| 2015/0199243 | A1 | 7/2015 | Wu et al. |
| 2017/0221240 | A1 | 8/2017 | Stetson et al. |
| 2018/0067652 | A1 | 3/2018 | Gold et al. |

FOREIGN PATENT DOCUMENTS

CN    104683374    3/2019

OTHER PUBLICATIONS

Understanding Failover Cluster in Windows Server, Quorum Clustering, Dec. 10, 2017, https://qiita.com/bmj0114/items/a18c137667805f075b62.
Oracle Database, Using Oracle Sharding, Feb. 2019, https://docs.oracle.com/en/database/oracle/oracle-database/19/shard/using-oracle-sharding.pdf.

* cited by examiner

*Primary Examiner* — Evan Aspinwall (57) ABSTRACT

A database management system includes a cluster of nodes over which a columnar database has been sharded into shards to which the nodes are subscribed. Source nodes of the cluster store up-to-date metadata objects for the shards, and target nodes of the cluster storing out-of-date metadata objects for the shards. A coordinator node initiates a parallel batch metadata transfer update process in which the out-of-date metadata objects at the target nodes are updated in parallel from the up-to-date metadata objects at the source nodes. The coordinator node can determine pairs of source nodes and target nodes; the source node and the target node of each pair respectively store an up-to-date metadata object and an out-of-date metadata object for a same shard.

20 Claims, 10 Drawing Sheets

| | SOURCE NODE | TARGET NODE | SHARD | |
|---|---|---|---|---|
| PAIR | 602A | 604A | 606A | ⎫ |
| PAIR | 602A | 604A | 606B | ⎬ 620 |
| PAIR | 602B | 604A | 606A | ⎬ |
| PAIR | 602B | 604B | 606B | ⎭ |

FIG 6C

| | SOURCE NODE | TARGET NODE | SHARD | |
|---|---|---|---|---|
| PAIR | 602A | 604A | 606A | ⎫ |
| PAIR | 602A | 604B | 606A | ⎬ 630 |
| PAIR | 602B | 604A | 606B | ⎬ |
| PAIR | 602B | 604B | 606B | ⎭ |

PARALLEL BATCH METADATA TRANSFER UPDATE PROCESS WITHIN SHARDED COLUMNAR DATABASE SYSTEM

BACKGROUND

Data is the lifeblood of many entities like business and governmental organizations, as well as individual users. Large-scale storage of data in an organized manner is commonly achieved using databases. Databases are collections of information that are organized for easy access, management, and updating. Data may be stored in tables over rows (i.e., records or tuples) and columns (i.e., fields or attributes). In a relational database, the tables have logical connections, or relationships, with one another, via keys, which facilitates searching, organization, and reporting of the data stored within the tables.

DETAILED DESCRIPTION

As noted in the background, databases store data in tables over rows and columns, where the tables can be interrelated with one another in relational databases. In more traditional row-oriented databases, tables store data by rows. By comparison, in column-oriented databases, which are also referred to as columnar databases, tables store data by columns.

Different columns, or different sets of columns, can be physically stored in different files, or file objects. Each file object has an associated metadata object. The metadata object stores metadata regarding a corresponding file object, such as the name of the file, how and whether the file is encrypted, and so on. The metadata object stores metadata regarding the data of the file object, too, such as the maximum and minimum values of the columns stored in the file object, and other information that may assist query processing.

Sharding a column-oriented database refers to the process of partitioning the rows of the database into different shards having corresponding file objects and associated metadata objects. For example, the rows may be sharded into multiple shards that each correspond to a different range of the values of one or more columns. Each shard includes a group of rows, and more specifically the columns of each of these rows. Sharding can be implemented using hashing, in which the values of one or more columns of a row are hashed to identify a particular shard to which the row is to be sharded.

In a shared-storage database, the file objects and their metadata objects of the shards are globally stored, and accessible by multiple nodes that can process queries in relation the data stored in the file objects. The nodes may be separate servers or other types of processing nodes that include processors, memory, and storage space. In a share-nothing database, each shard's file and metadata objects are accessible by one corresponding node of a cluster of nodes. Each node may locally store the objects for the shard(s) for which the node is responsible.

A modification of the shared-storage and share-nothing databases is to permit more than one node of the cluster to each locally store the metadata object of a shard. The file object for a shard may also be stored locally at each node, or may be stored on a shared storage. A node that stores the file and metadata objects for a shard is said to be subscribed to the shard. Each shard can have more than one subscribing node, and each node can subscribe to more than one shard. However, not all nodes are usually subscribed to all shards, as is effectively the case in a shared-storage database.

The number of nodes subscribed to a shard can vary over time. A subscribing node may fail and then recover. During lower-usage times of the database, subscribing nodes may go offline, and then brought back online during higher-usage times of the database. New nodes may be added over time as subscribers to the shards, to accommodate overall increased usage of the database.

When a new node is added to a database as a subscriber of a shard, or a prior node subscribing to the shard fails and recovers or goes offline and is brought back online, the node's metadata object for the shard will be out-of-date. That is, while a node is offline, it will have missed any updates to the metadata object for the shard. The metadata object has to be updated from the metadata of an up-to-date object of another node that also subscribes to the shard. The updating process can include transferring checkpoint and/or transaction logs and performing the operations identified in the logs until the out-of-date metadata object is in the same state as the up-to-date metadata object, and thus also up-to-date.

Each time a node has to have a metadata object brought up-to-date, a lock is placed on the cluster of nodes as a whole until the metadata object is updated. That is, the out-of-date metadata object of a node for a shard to which the node subscribes is brought up-to-date in a separate transaction. If multiple nodes have out-of-date metadata objects, they are serially updated over separate transactions. In each transaction, a lock is placed on the cluster of nodes.

The number of transactions is therefore equal to the number of nodes that have out-of-date metadata objects. If a large number of nodes have out-of-date metadata objects, a large number of transactions are serially processed, during which time the database cannot be updated due to the locks. Serially processing the transactions to update the out-of-data metadata objects of multiple nodes can take considerable time, during which database performance decreases.

Techniques described herein improve database performance by decreasing the length of time to update nodes having out-of-data objects for shards to which the nodes subscribe. A coordinator node of the cluster identifies each node storing an out-of-date metadata object for a shard. Such nodes are referred to as target nodes. For each out-of-date metadata object of each target node, the coordinate node identifies a node storing an up-to-date metadata object for the same shard. Such nodes are referred to as source nodes.

The coordinator node initiates a parallel batch metadata transfer update process in which the target nodes are updated in parallel from their respectively identified source nodes. Updating occurs more quickly, because the target nodes are updated in parallel, within one transaction. Multiple transactions are not needed. A lock is placed on the cluster of nodes prior to initiation of the update process, and released once the update process has finished. Because updating occurs within one transaction, multiple successive locks on the cluster are not needed.

Figure 1:
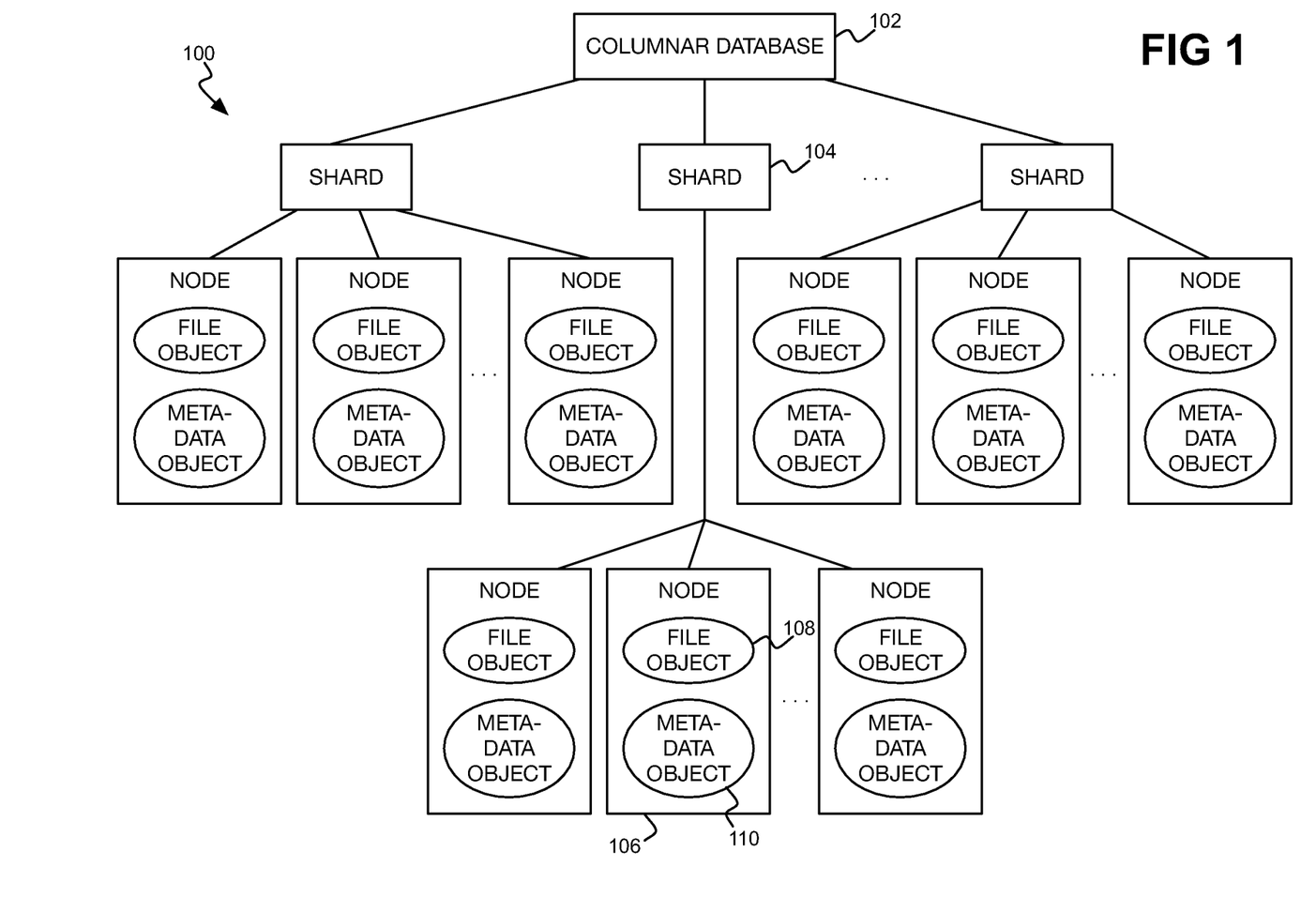
FIG. 1 is a diagram an example system including a columnar database.

FIG. 1 shows an example system 100 including a columnar database 102, which may be the Vertica database management system available from Vertica Systems, of Cambridge, Mass., which is a subsidiary of Micro Focus International plc, of Newbury, U.K. The database 102 has been sharded into shards 104. Each shard 104 encompasses different values of one or more columns of the database 102 and stores the rows of the database 102 having these column values. As noted above, the database 102 can be sharded into shards 104 by hashing the values of one or more columns of each row to identify the shard 104 encompassing these columnar values and thus the shard to which each row belongs.

Nodes 106 are subscribed to each shard 104. Each node 106 locally stores a metadata object 110 for a shard 104 to which it subscribes (i.e., including metadata regarding the file object 108 for the shard 104). In the implementation of FIG. 1, each node 106 also locally stores a file object 108 storing the data of a shard 104 to which it subscribes (i.e., including the values of the columns of the database 102 to which the shard 104 corresponds). In another implementation, the file objects 108 for the shards 104 can be stored on shared storage, and not locally at the nodes 106.

As depicted in FIG. 1, more than one node 106 is subscribed to each shard 104. More generally, there is at least one node 106 subscribed to each shard 104; there can be shards 104 that each have just one subscribing node 106. As depicted in FIG. 1, each node 106 subscribes to one shard 104. More generally, each node 106 subscribes to one or more shards 104; the nodes 106 can each subscribe to multiple shards 104. For every shard 104 to which a node 106 subscribes, the node 106 stores a different metadata object 110, and in the implementation of FIG. 1, a different file object 108. Every node 106 is not subscribed to every shard 104. The nodes 106 are together referred to as a cluster of nodes 106, over which the database 102 has been sharded into the shards 104.

Figure 2:
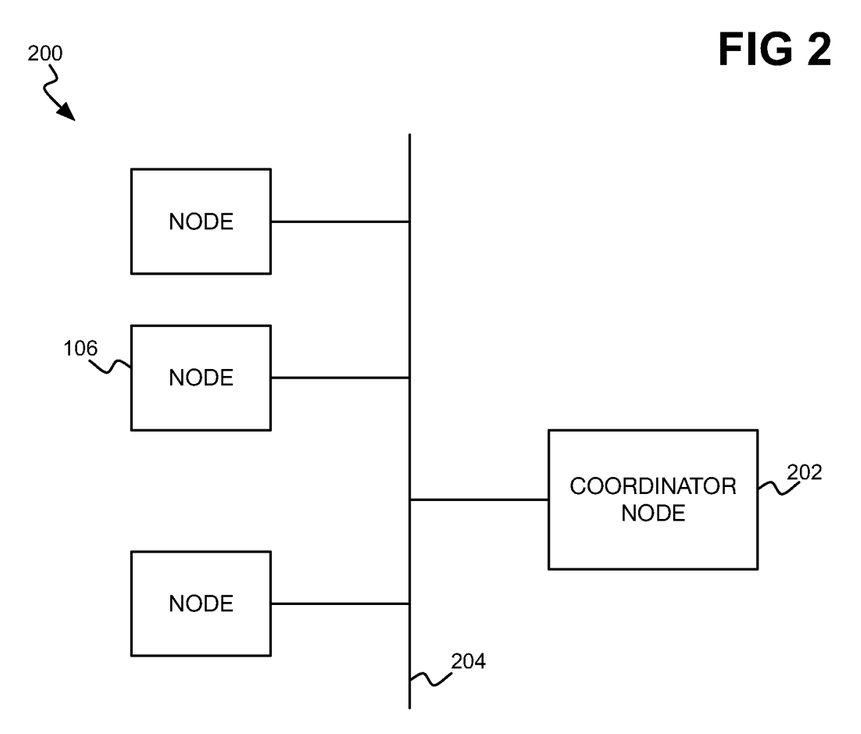
FIG. 2 is a diagram of an example cluster of nodes.

FIG. 2 shows an example node cluster 200. The cluster 200 includes the nodes 106 over which the columnar database 102 of FIG. 1 has been sharded into shards 104, as well as a coordinator node 202. The coordinator node 202 may be one of the nodes 106 over which the database 102 has been sharded, or may be a different node as is specifically shown in FIG. 2. The nodes 106 and 202 are communicatively connected to one another over a network 204, such as an Ethernet network, a storage area network (SAN), or another type of network.

Each node 106 and 202 is a computing node, such as a server. Each node 106 and 202 may thus include hardware, such as one or more processors, memory, and physical storage. Each node 106 can process queries against the database 102 with respect to the columnar values of each shard 104 to which it subscribes. The physical storage of each node 106 stores the file object 108 and the metadata object 110 for each shard 104 to which it subscribes.

Figure 3A:
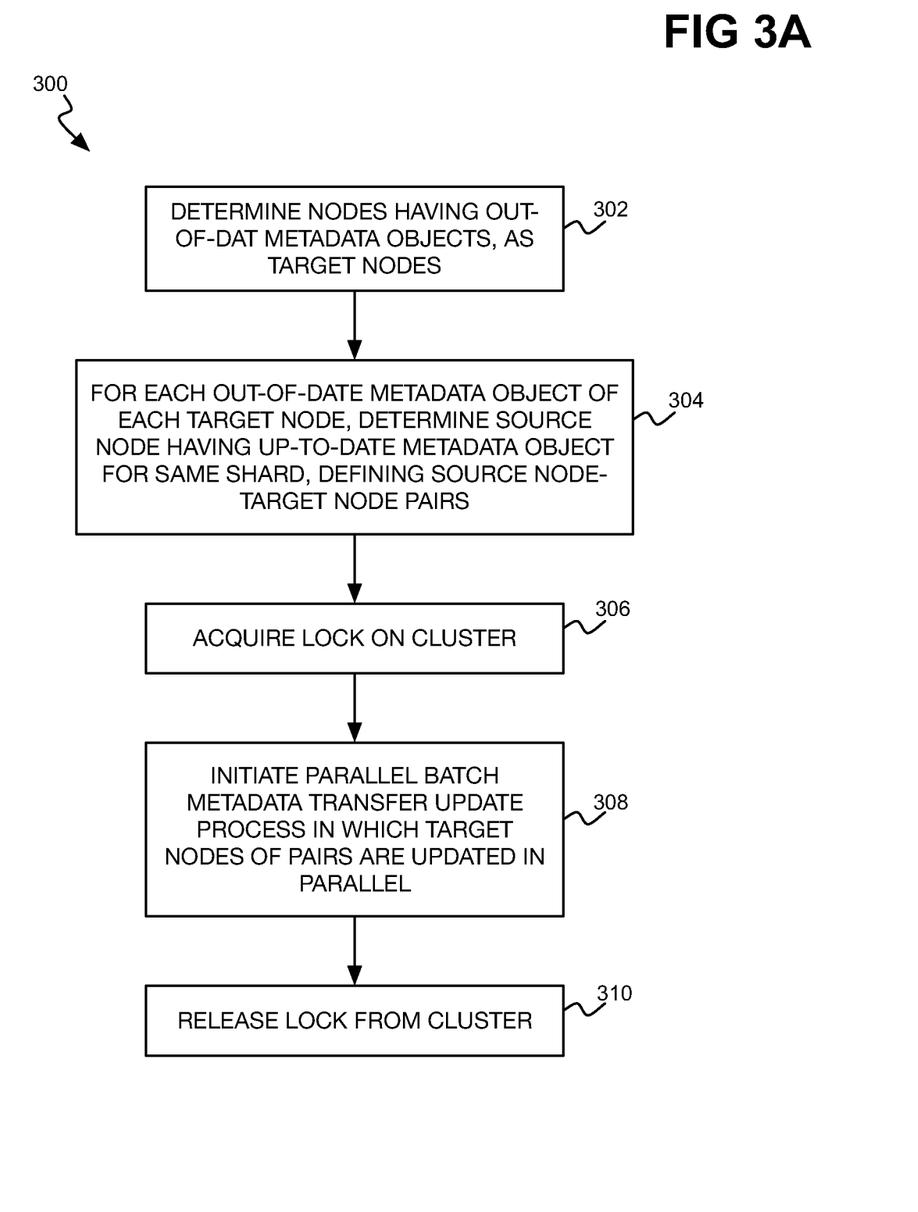
FIG. 3A is a flowchart of an example method for updating out-of-date metadata objects at target nodes subscribing to shards over which a columnar database has been sharded.

FIG. 3A shows an example method 300 for updating the nodes 106 storing out-of-date metadata objects 110 for their subscribed shards 104. The coordinator node 202 can perform the method 300. The method 300 may be implemented as program code stored on a non-transitory computer-readable data storage medium and executable by a processor of the coordinator node 202. The method 300 may be periodically performed, on a schedule or on-demand. When the method 300 is performed, a number of nodes 106 may be storing out-of-date metadata objects 110 for the shards 104 to which they are subscribed.

As noted above, an example of a node 106 storing an out-of-date metadata object 110 for a shard 104 is a node that failed and which has been brought back online. Another example of such a node 106 is a node that went offline and subsequently came back online according to a schedule. A third example of such a node 106 is a node that has been added to the cluster 200 of and subscribed to one or more shards 104 to accommodate increased usage of the columnar database 102.

The coordinator node 202 determines the nodes 106 that have out-of-date metadata objects 110 (302). The nodes 106 identified in part 302 are referred to as target nodes. Each target node has at least one out-of-date metadata object 110. Each out-of-date metadata object 110 of a target node corresponds to a different shard 104 to which the target node subscribes.

For each out-of-date metadata object 110 of each target node, the coordinator node 202 determines a node 106 having an up-to-date metadata object 110 for the same shard 104 (304). The nodes 106 identified in part 304 are referred to as source nodes. Identification of the source nodes thus defines source node-target node pairs. Each pair includes a target node and a source node subscribed to the same shard 104. The target node of a pair stores an out-of-date metadata object 110 for the shard 104, and the source node of the pair stores an up-to-date metadata object 110 for the shard 104.

A target node can be part of more than one source node-target node pair. For example, a target node may be subscribed to more than one shard 104 and have an out-of-date metadata object 110 for each shard 104. The target node will therefore be part of multiple pairs equal in number to the out-of-date metadata objects 110 that the target node stores.

A source node can similarly be part of more than one source node-target node pair. For example, for a shard 104 for which multiple target nodes each store an out-of-date metadata object 110, a source node may have an up-to-date metadata object 110. The source node can therefore be part of each pair including a target node that stores an out-of-date metadata object 110 for this shard 104. The source node may not be part of every such pair, however, if a different source node also subscribes to the shard 104.

As another example, a source node may be subscribed to more than one shard 104 and have an up-to-date metadata object 110 for each shard 104. For each shard 104 to which the source node is subscribed, the same or different target node may store an out-of-date metadata object 110. The source node can therefore be part of each pair including a target node that stores an out-of-date metadata object 110 for one of the shards 104 to which the source node subscribes. The source node may not be part of every such pair, however, if a different source node also subscribes to any of these shards 104.

In determining the source nodes to pair with the target nodes, the coordinator node 202 may employ a variety of different approaches. For example, the coordinator node 202 may attempt to minimize the overall number of source nodes that are included in the source node-target node pairs. Therefore, a source node that stores up-to-date metadata objects 110 for multiple shards 104 for which target nodes store out-of-date metadata objects 110 may be selected over multiple source nodes that each store an up-to-date metadata object 110 for just one of these shards 104.

As another example, the coordinator node 202 may attempt to minimize the number of source nodes that are included in the source node-target node pairs for any given target node. For example, a source node that stores up-to-date metadata objects for multiple shards 104 for which a given target node stores out-of-date metadata objects may be selected over multiple source nodes that each store an up-to-date metadata object 110 for just one of these shards. The coordinator node 202 may also take into account inter-node distance, inter-node network bandwidth, node processing capacity, and other factors in determining the source node-target node pairs.

The coordinator node 202 may acquire a lock on the cluster 200 of nodes 106 and 202 (306). The lock can be referred to as a commit lock. While the coordinator node 202 holds the lock over the cluster 200 as a whole, no file object 108 and thus no metadata object 110 of any node 106 can be changed. The columnar database 102 therefore cannot be updated while the coordinator node 202 holds the lock.

The coordinator node 202 initiates a parallel batch metadata transfer update process (308). In the process, the target nodes of the source node-target node pairs have their out-of-date metadata objects 110 respectively updated in parallel from the up-to-date metadata objects 110 of the pairs' source nodes. The process is a parallel process because the target nodes are updated in parallel. The process is a batch process because the target nodes are updated in one transaction. The process is a metadata process because metadata at the target nodes is updated. The process is a transfer process because metadata is transferred from the source nodes to the target nodes. The process is an update process because the target nodes are updated.

Once the parallel batch metadata transfer update process has been completed, the coordinator node 202 releases the lock that it is holding on the cluster 200 of nodes 106 and 202 (310). Updating of the columnar database 102 can thus resume. Per the method 300, updating of the metadata objects 110 at multiple target nodes can occur within one transaction, and not over successive transactions, in which a total of one commit lock is held, as opposed to multiple locks.

Figure 3B:
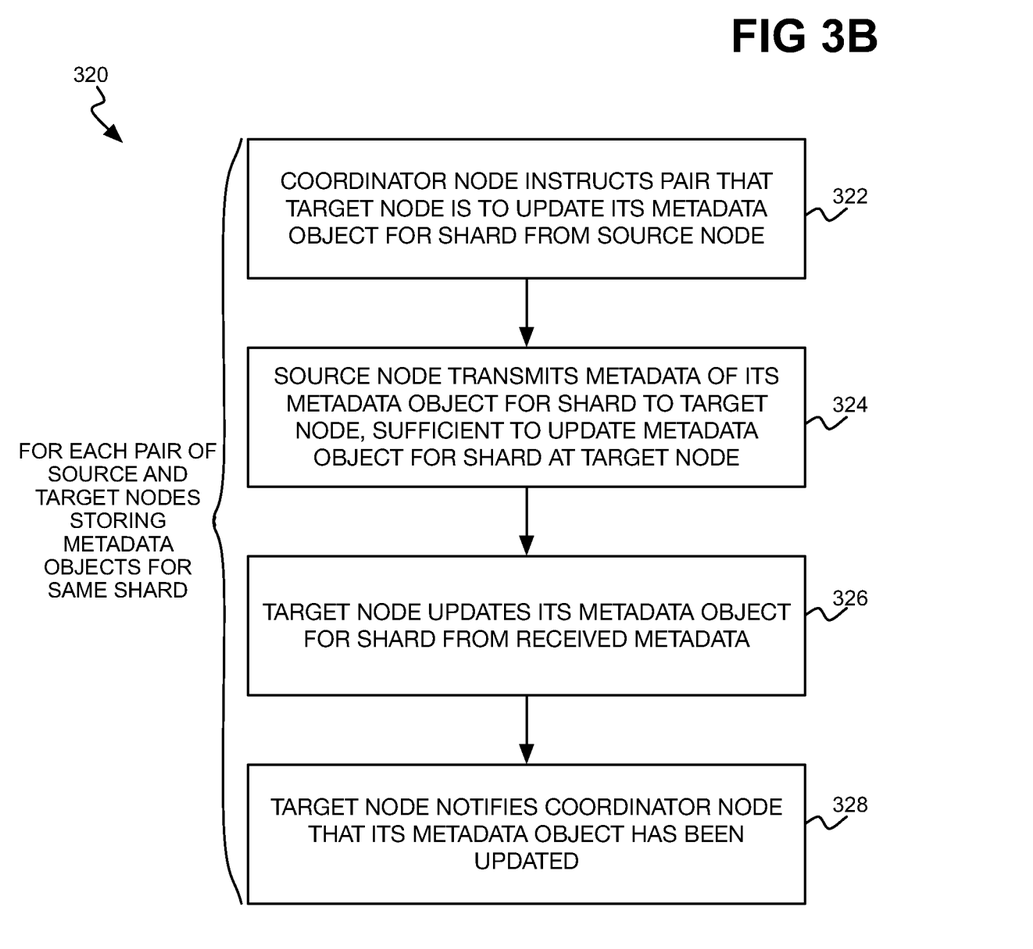
FIG. 3B is a flowchart of an example method for updating a target node's out-of-date metadata for a shard from a source node's up-to-date metadata for the shard.

FIG. 3B shows an example method 320 of the parallel batch metadata transfer update process of part 308 as the process pertains to one source node-target node pair. The method 320 is performed for each pair defined in part 304 of FIG. 3A. The coordinator node instructs the source node and target node of a pair that the target node is to update its out-of-date metadata object 110 for a shard 104 from the up-to-date metadata object 110 that the source node stores for the shard 104 (322). Once the coordinator node instructs the nodes of a source node-target node pair, the coordinator node can immediately proceed with instructing the nodes of another pair (i.e., in another iteration of the method 320), until the nodes of every pair have been instructed.

The source node transmits metadata of its metadata object 110 for the shard 104 that is sufficient to bring the metadata object 110 for the shard 104 at the target node up-to-date (324). As noted above, this update process can include transferring checkpoint and/or transaction logs from the source node to the target node. The target node may indicate its latest state to the source node, for instance, so that the source node can determine which logs to send to the target node.

The target node updates its metadata object 110 for the shard 104 from the received metadata (326), to bring the metadata object 110 up-to-date. As noted above, this update process can include performing the operations identified in each log received from the source node. Once the target node has performed the operations, its metadata object 110 for the shard 104 is therefore up-to-date.

The target node notifies the coordinator node that the metadata object 110 for this shard 104 has been updated (328). When the coordinator node receives this notification from the target node of every source node-target node pair (i.e., for each iteration of the method 320), the parallel batch metadata transfer update process is complete. The coordinator node may then release the commit lock from the cluster 200, in part 310 of FIG. 3A.

Figure 4:
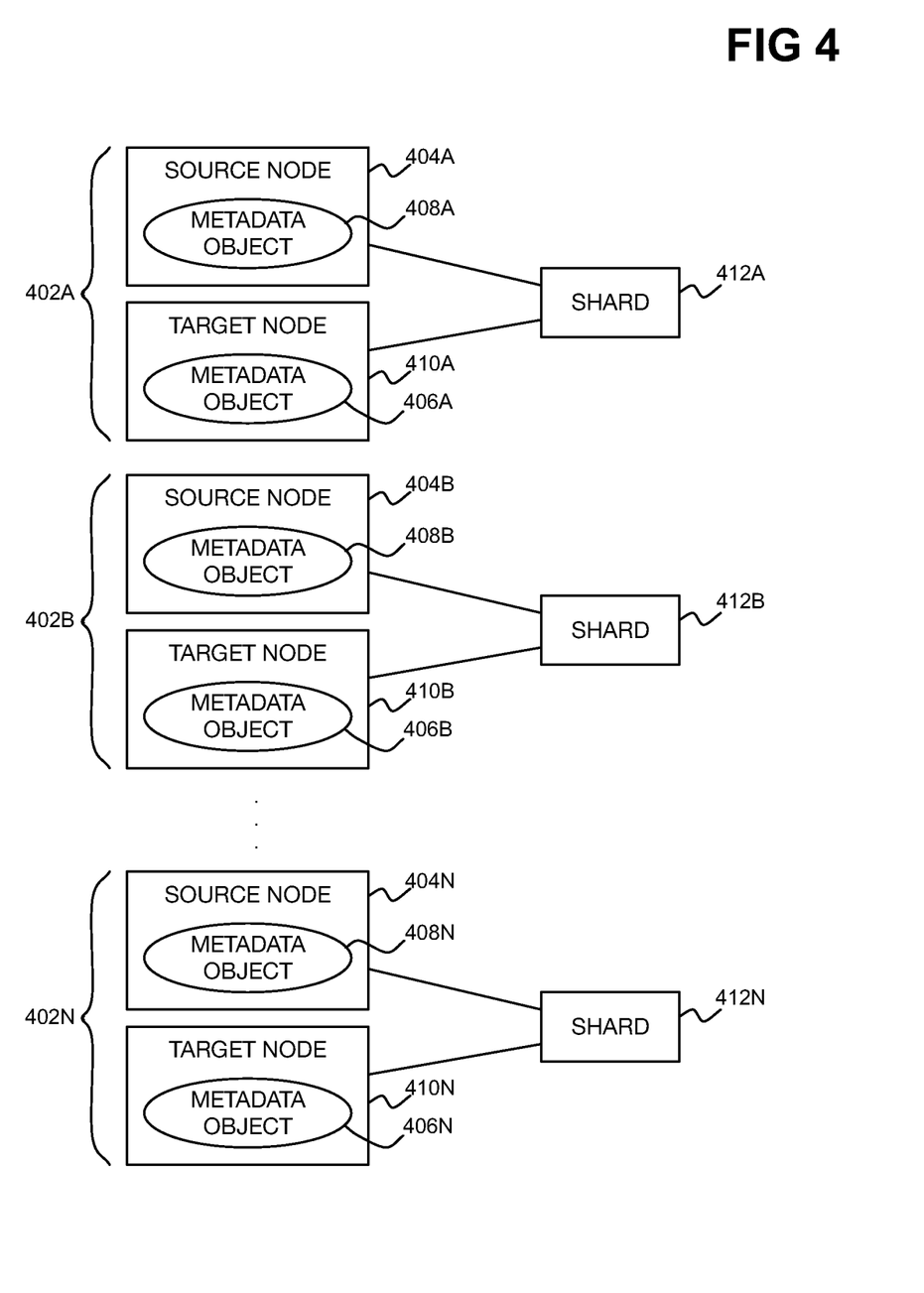
FIG. 4 is a diagram of example source node-target node pairs.

FIG. 4 illustratively depicts example source node-target node pairs 402A, 402B, . . . , 404N, collectively referred to as the pairs 402. The coordinator node 202 may determine the pairs 402 by performing parts 302 and 304 of the method 300. The source node-target node pairs 402 respectively pertain to shards 412A, 412B, . . . , 412N, collectively referred to as the shards 412. Each pair 402 pertains to one shard 412. However, more than one source node-target node pair 402 may pertain to the same shard 412. For example, the shard 412A may be the same shard as the shard 412B.

The source node-target node pairs 402 respectively included source nodes 404A, 404B, . . . , 404N, collectively referred to as the source nodes 404, and target nodes 406A, 406B, . . . , 406N, collectively referred to as the target nodes 406. Each pair 402 includes one source node 404 and one target node 406. A source node 404 may be part of more than one pair 402. For example, the source nodes 404A and 404B may be the same node. A target node 406 may likewise be part of more than one pair 402. For example, the target nodes 406A and 406B may be the same node.

The source nodes 404 respectively store up-to-date metadata objects 408A, 408B, . . . , 408N, collectively referred to as the metadata objects 408, for the shards 412 of their pairs 402. The target nodes 406 similarly respectively store out-of-date metadata objects 410A, 410B, . . . , 410N, collectively referred to as the metadata objects 410, for the shards 412 of their pairs 402. For example, the pair 402A includes the source node 404A and the target node 406A that respectively store metadata objects 408A and 410A for the same shard 412A.

While more than one pair 402 may pertain to the same shard 412, and each source node 404 and each target node 406 may be part of more than one pair 402, each pair 402 identifies a unique tuple of a particular shard 412, a particular source node 404, and a particular target node 406. For example, while the source node 404A of the pair 402A may be a part of one or more other pairs 402, the pair 402A is the only pair 402 that includes this source node 404A and the target node 406A, and that pertains to the shard 412A. As another example, while the nodes 404B and 406B of the pair 402B may both be part of one or more other pairs 402, the pair 402B is the only pair 402 including these two nodes 404B and 406B and that pertains to the shard 412B.

For each pair 402, the metadata object 410 pertaining to the shard 412 at the target node 406 is updated from metadata of the metadata object 408 pertaining to the same shard 412 at the source node 404. The target node 406 of each pair 402 is updated in parallel with the target node 406 of every other pair 402. Such a parallel, or concurrent, batch metadata transfer update process occurs more quickly than a serial update process in which the target nodes 406 are updated sequentially. Database performance improves, because normal database usage can resume sooner.

Figure 5A:
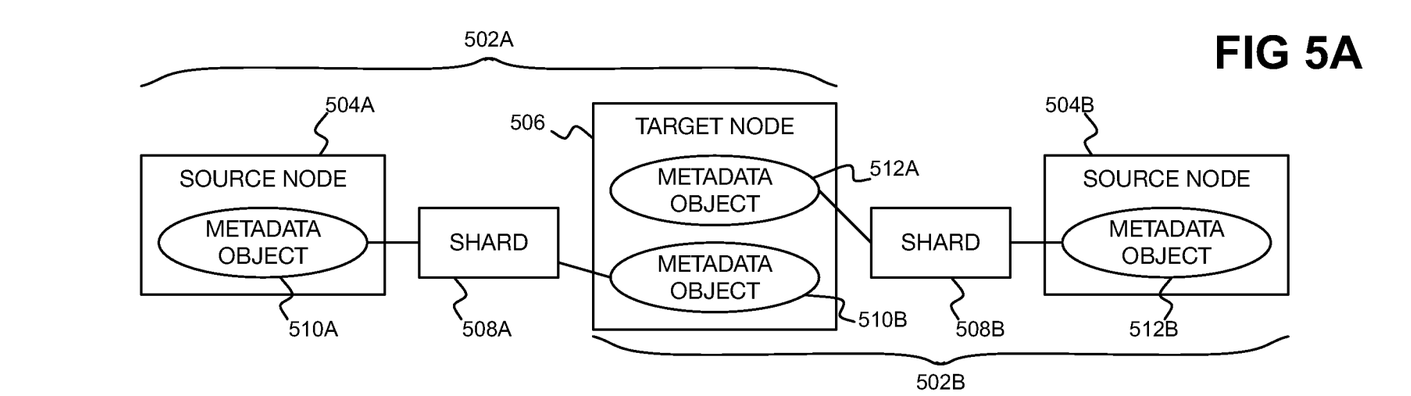
FIGS. 5A and 5B are diagrams of different example source node-target node pairs that include the same node.
Figure 5B:
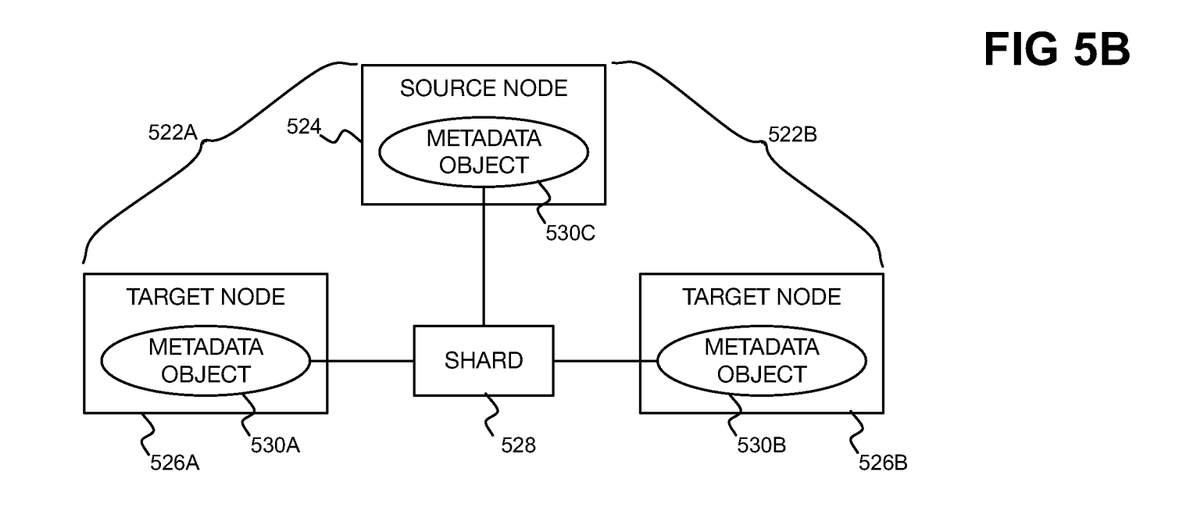

FIGS. 5A and 5B show different examples of how multiple source node-target node pairs can include the same node. The coordinator node 202 can determine the pairs of FIGS. 5A and 5B in parts 302 and 304 of the method 300. In FIG. 5A, there are two source node-target node pairs 502A and 502B, which are collectively referred to as the pairs 502. In FIG. 5B, there are two source node-target node pairs 522A and 522B, which are collectively referred to as the pairs 502.

In FIG. 5A, both source node-target node pairs 502 include the same target node 506. The pair 502A also includes the source node 504A and the pair 502B also includes the source node 504B. The source nodes 504A and 504B are collectively referred to as the source nodes 504, and are different from one another. The source node 504A and the target node 506 pertain to the shard 508A, and the source node 504B and the target node 506 pertain to the shard 508B. The shards 508A and 508B are collectively referred to as the shards 508, and are different from one another.

The source node 504A stores an up-to-date metadata object 510A for the shard 508A, whereas the source node 504B stores an up-to-date metadata object 512B for the shard 508B. The target node 506 stores an out-of-date metadata object 510B for the shard 508A, and a different out-of-date metadata object 512A for the shard 508B. The target node 506 is updated from both the source nodes 504 during the parallel batch metadata transfer update process. Specifically, the target node 506's metadata object 510B is updated in parallel from the source node 504A's metadata object 510A, and the target node 506's metadata object 512A is updated from the source node 504B's metadata object 512B.

In FIG. 5B, both source node-target node pairs 522 include the same source node 524. The pair 522A also includes the target node 526A and the pair 522B also includes the target node 526B. The target nodes 526A and 526B are collectively referred to as the target nodes 526, and are different from one another. The target nodes 526 both pertain to the shard 528, as does the source node 524.

The target node 526A stores an out-of-date metadata object 530A for the shard 528, and the target node 526B stores an out-of-date metadata object 530B for the shard 528. The source node 524 stores an up-to-date metadata object 530C for the shard 528. Both target nodes 526 are updated in parallel from the source node 524 during the parallel batch metadata transfer update process. Specifically, the target node 526A's metadata object 530A and the target node 526B's metadata object 530B are each updated from the source node 524's metadata object 530C.

Figure 6A:
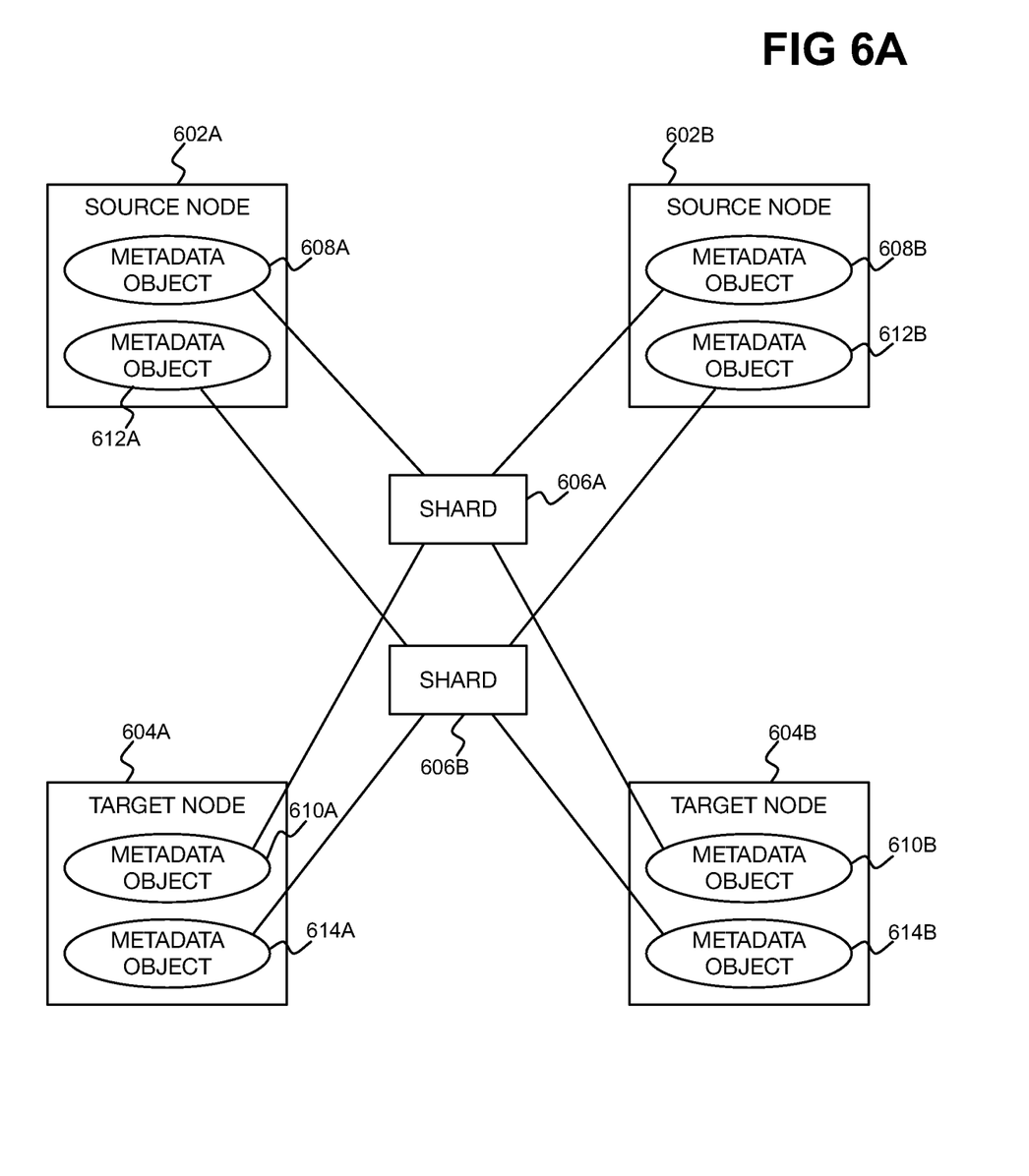
FIG. 6A is a diagram of an example of multiple source nodes and multiple target nodes pertaining to the same multiple shards.

FIG. 6A shows how an example of how multiple source nodes and multiple target nodes can pertain to the same multiple shards. Source nodes 602A and 602B, collectively referred as the source nodes 602, each pertain to shards 606A and 606B, collectively referred to as the shards 606. Similarly, target nodes 604A and 604B, collectively referred to as the target nodes 604, each pertain to the shards 606.

The source nodes 602 respectively store up-to-date metadata objects 608A and 608B for the shard 606A, which are collectively referred to as the metadata objects 608. The source nodes 602 likewise respectively store up-to-date metadata objects 612A and 612B for the shard 606B, which are collectively referred to as the metadata objects 612. The target nodes 604 respectively store out-of-date metadata objects 610A and 610B for the shard 606A, which are collectively referred to as the metadata objects 610. The target nodes 604 likewise respectively store out-of-date metadata objects 614A and 614B for the shard 606B, which are collectively referred to as the metadata objects 614.

Figure 6B:
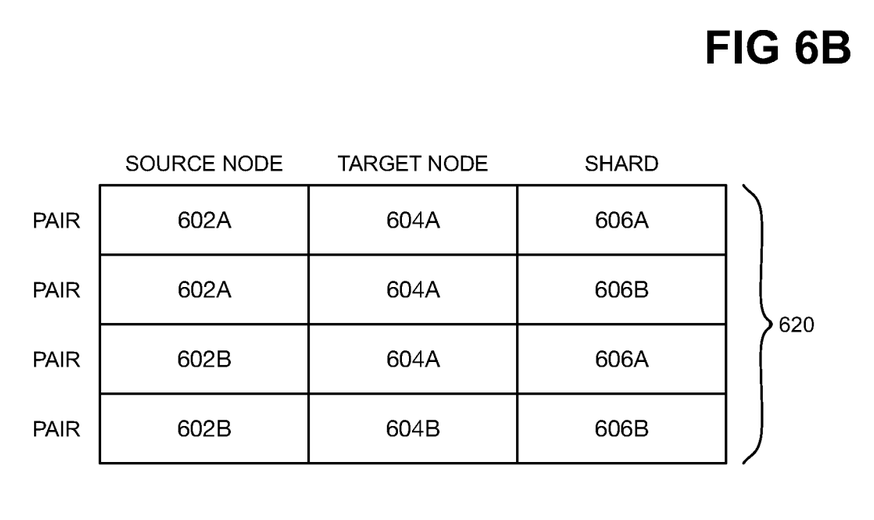
FIGS. 6B and 6C are tables defining different pairs of the source nodes and target nodes of FIG. 6A.
Figure 6C:
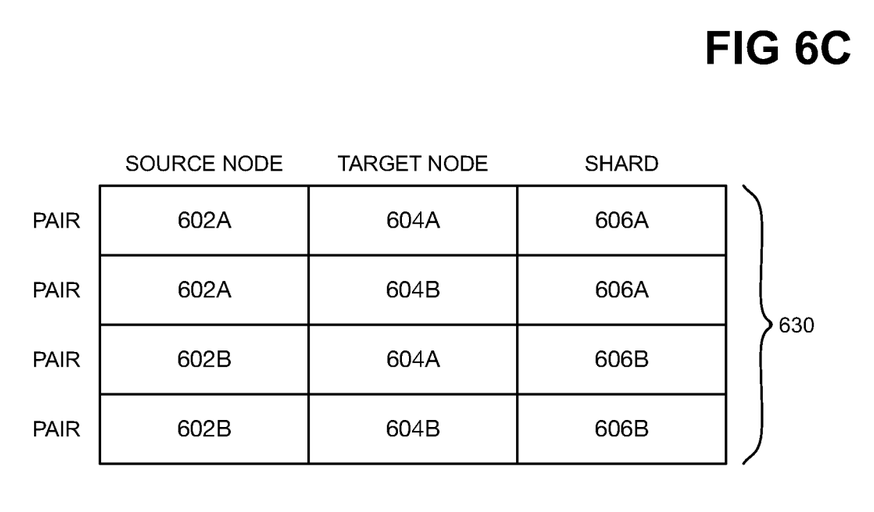

FIGS. 6B and 6C show different examples of how source node-target node pairs can be defined with respect to the source nodes 602, the target nodes 604, and the shards 606. The coordinator node 202 can determine the pairs of FIGS. 6B and 6C in parts 302 and 304 of the method 300. The coordinator node 202 may select the pairs of FIG. 6B as opposed to the pairs of FIG. 6C (or vice-versa) depending on the approach that the coordinator node 202 uses to determine source node-target node pairs, examples of which have been noted above.

In FIG. 6B, four source node-target node pairs 620 have been identified. The first two pairs 620 both pertain to the source node 602A and the target node 604A, but to different shards 606. The target node 604A has both its metadata object 610A for the shard 606A and its metadata object 614A for the shard 606B updated from the same source node 602A. Specifically, the target node 604A's metadata object 610A is updated from the source node 602A's metadata object 608A for the shard 606A, and the target node 604A's metadata object 614A is updated from the source node 602A's metadata object 612A for the shard 606B.

The second two pairs 620 in FIG. 6B both pertain to the source node 602B and the target node 604B, but to different shards 606. The target node 604B has both its metadata object 610B for the shard 606A and its metadata object 614B for the shard 606B updated from the same source node 602B. Specifically, the target node 604B's metadata object 610B is updated from the source node 602B's metadata object 608B for the shard 606A, and the target node 604B's metadata object 614B is updated from the source node 602B's metadata object 612B for the shard 606B.

In FIG. 6C, four different source node-target node pairs 630 have been identified. The first two pairs 630 both pertain to the source node 602A and the shard 606A, but to different target nodes 604. Both target nodes 604 have their respective metadata objects 610 for the shard 606A updated from the same source node 602A. Specifically, the metadata objects 610 of both target nodes 604 are updated from the source node 602A's metadata object 608A for the shard 606A.

The second two pairs 630 in FIG. 6C both pertain to the source node 602B and the shard 606B, but to different target nodes 604. Both target nodes 604 have their respective metadata objects 612 for the shard 606B updated from the same source node 602B. Specifically, the metadata objects 612 of both target nodes 604 are updated from the source node 602B's metadata object 612B for the shard 606B.

Figure 7:
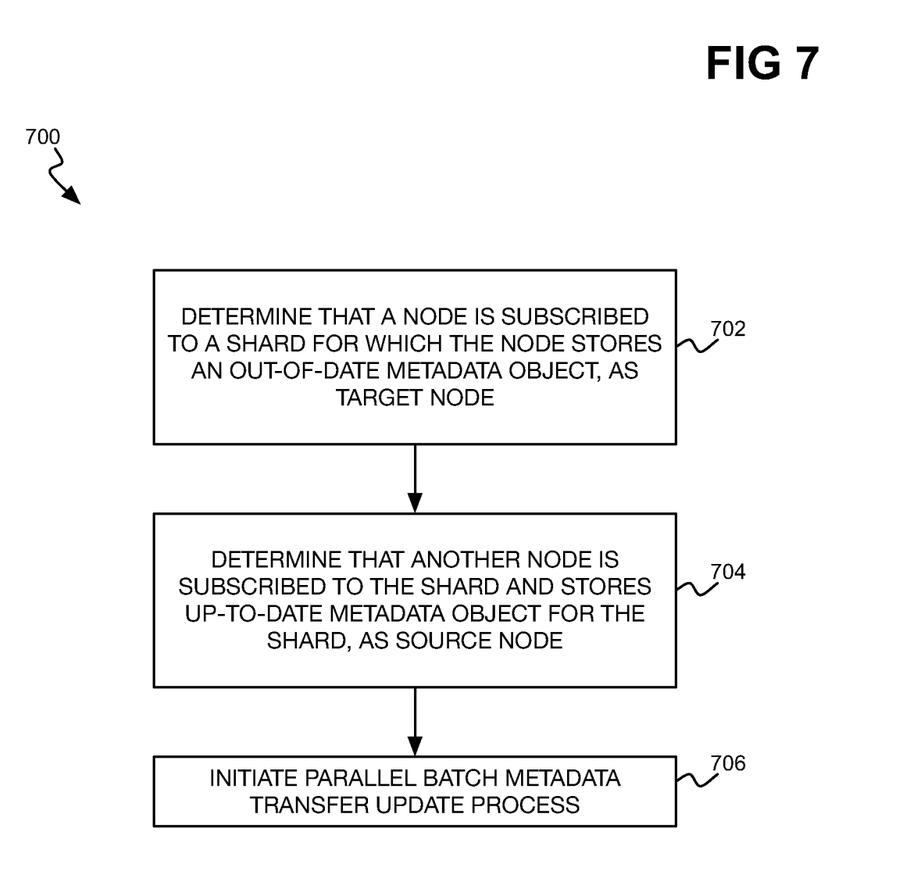
FIG. 7 is a flowchart of an example method.

FIG. 7 shows an example method 700. A coordinator node of a cluster of nodes over which a columnar database has been sharded into shards can perform the method 700. The coordinator node determines that a first target node of the cluster is subscribed to a first shard of the plurality of shards and stores a metadata object for the first shard that is out-of-date (702). The coordinator node determines a first source node of the cluster that is subscribed to the first shard and that stores a metadata object for the first shard that is up-to-date (704). The coordinator node initiates a parallel batch metadata transfer update process comprising updating the metadata object for the first shard at the first target node from the metadata object at the first source node (706).

Figure 8:
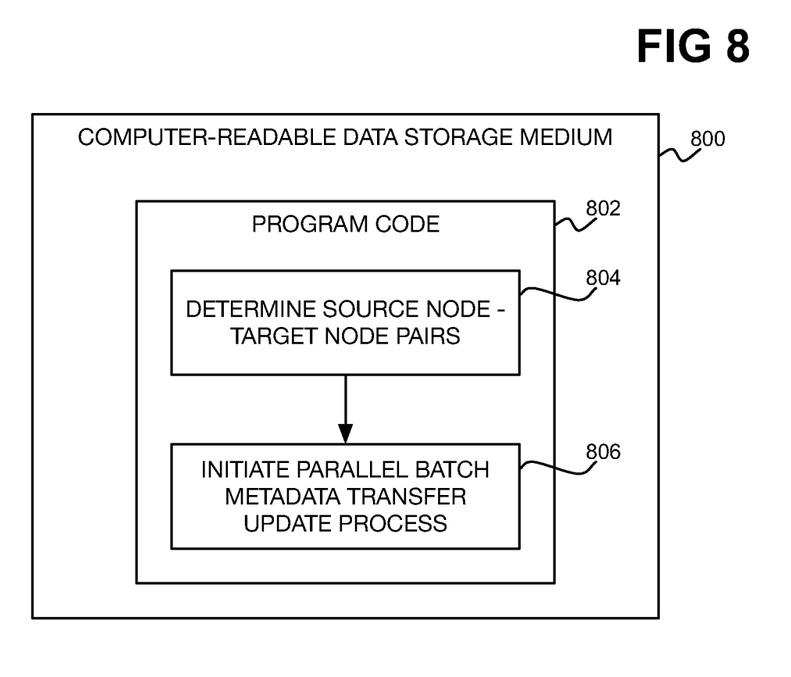
FIG. 8 a diagram of an example computer-readable data storage medium.

FIG. 8 shows an example non-transitory computer-readable data storage medium storing program code (800). The program code is executable by a coordinator node of a cluster of nodes, over which a columnar database has been sharded into shards to which the nodes are subscribed, to perform processing (802). The processing includes determining pairs of source nodes and target nodes of the cluster of nodes (804). The source node and the target node of each pair respectively storing an up-to-date metadata object and an out-of-date metadata object for a same shard. The processing includes initiating a parallel batch metadata transfer update process in which the target nodes of the pairs are updated in parallel (806). For each pair, the out-of-date metadata object at the target node of the pair is updated from the up-to-date metadata object at the source node of the pair.

Figure 9:
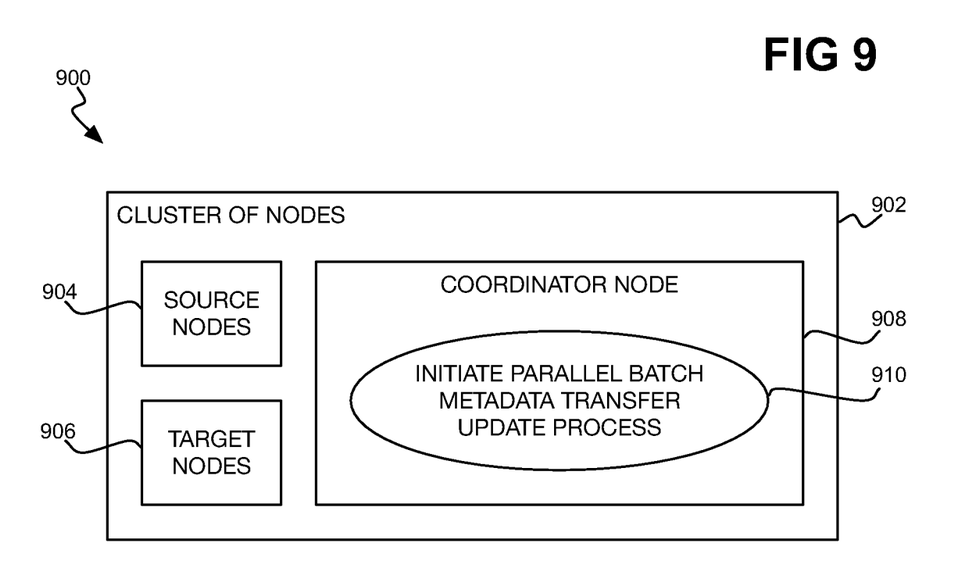
FIG. 9 is a diagram of an example system.

FIG. 9 shows an example database management system (900). The system 900 includes a cluster of nodes 902 over which a columnar database has been sharded into shards to which the nodes are subscribed. The cluster of nodes 902 includes source nodes 904 storing up-to-date metadata objects for the shards, and target nodes 906 storing out-of-date metadata objects for the shards. The cluster of nodes 902 includes a coordinator node to initiate a parallel batch metadata transfer update process in which the out-of-date metadata objects at the target nodes are updated in parallel from the up-to-date metadata objects at the source nodes.

Techniques have been described to update nodes storing out-of-date metadata objects for shards of a columnar database from nodes storing up-to-date metadata objects for the shards. Rather than sequentially update the nodes storing out-of-date metadata objects, source node-target node pairs are identified so that the target nodes can be updated in parallel from the source nodes. Database performance improves, by minimizing the amount of time the database is unavailable when updating the out-of-date metadata objects.

We claim:

1. A method comprising:
   determining, by a coordinator node of a cluster of nodes over which a columnar database has been sharded into a plurality of shards, that a first target node of the cluster is subscribed to a first shard of the plurality of shards and stores a metadata object for the first shard that is out-of-date;
   determining, by the coordinator node, a first source node of the cluster that is subscribed to the first shard and that stores a metadata object for the first shard that is up-to-date; and
   initiating, by the coordinator node, a parallel batch metadata transfer update process comprising updating the metadata object for the first shard at the first target node from the metadata object at the first source node.

2. The method of claim 1, further comprising:
   acquiring, by the coordinator node, a commit lock for the cluster, wherein the coordinator node initiates the parallel batch metadata transfer update process upon acquisition of the commit lock; and
   releasing, by the coordinator node, the commit lock, upon completion of the parallel batch metadata transfer update process.

3. The method of claim 1, wherein updating the metadata object at the first target node from the metadata object at the first source node comprises:
   instructing, by the coordinator node, the first target node and the first source node that the first target node is to update the metadata object at the first target node from metadata of the metadata object at the first source node;
   transmitting, by the first source node to the first target node, the metadata of the metadata object at the first source node needed to update the metadata object at the first target node; and
   updating, by the first target node, the metadata object at the first target node from the metadata transmitted by the first source node.

4. The method of claim 1, further comprising:
   determining, by the coordinator node, that the first target node is subscribed to a second shard of the plurality of shards and stores a metadata object for the second shard that is out-of-date; and
   determining, by the coordinator node, a second source node of the cluster that is subscribed to the second shard and that stores a metadata object for the second shard that is up-to-date,
   wherein the parallel batch metadata transfer update process further comprises updating the metadata object for the second shard at the first target node from the metadata object at the second source node, in parallel with updating the metadata object for the first shard at the first target node from the metadata object at the first source node.

5. The method of claim 4, wherein the second shard is different than the first shard, and the second source node is different than the first source node.

6. The method of claim 1, further comprising:
   determining, by the coordinator node, that a second target node of the cluster of nodes is subscribed to the first shard and stores a metadata object for the first shard that is out-of-date; and
   determining, by the coordinator node, a second source node of the cluster that is subscribed to the first shard and that stores a metadata object for the first shard that is up-to-date,
   wherein the parallel batch metadata transfer update process further comprises updating the metadata object for the first shard at the second target node from the metadata object at the second source node, in parallel with updating the metadata object for the first shard at the first target node from the metadata object at the first source node.

7. The method of claim 6, wherein the second source node is the first source node.

8. A non-transitory computer-readable data storage medium storing program code executable by a coordinator node of a cluster of nodes to perform processing comprising:
   determining a plurality of pairs of source nodes and target nodes of the cluster of nodes over which a columnar database has been sharded into a plurality of shards to which the nodes of the cluster are subscribed, the source node and the target node of each pair respectively storing an up-to-date metadata object and an out-of-date metadata object for a same shard; and
   initiating a parallel batch metadata transfer update process in which the target nodes of the pairs are updated in parallel, wherein for each pair, the out-of-date metadata object at the target node of the pair is updated from the up-to-date metadata object at the source node of the pair.

9. The non-transitory computer-readable data storage medium of claim 8, wherein the processing further comprises:
   acquiring a commit lock for the cluster, wherein the parallel batch metadata update process is initiated upon acquisition of the commit lock; and releasing the commit lock for the cluster, upon completion of the parallel batch metadata transfer update process.

10. The non-transitory computer-readable data storage medium of claim 8, wherein initiating the parallel batch metadata transfer update process comprises instructing the target node and the source node of each pair that the target node is to update the metadata object at the target node from metadata of the metadata object at the source node.

11. The non-transitory computer-readable data storage medium of claim 8, wherein the cluster of nodes comprises a given node subscribed to more than one shard.

12. The non-transitory computer-readable data storage medium of claim 11, wherein the plurality of pairs of source nodes and target nodes comprises:
   a first pair comprising a first source node and a first target node that are both subscribed to a first shard; and
   a second pair comprising a second source node and the first target node that are both subscribed to a second shard,
   wherein the first target node is updated in parallel from the first source node with respect to the first shard and from the second target node with respect to the second shard.

13. The non-transitory computer-readable data storage medium of claim 12, wherein the second source node is different than the first source node.

14. The non-transitory computer-readable data storage medium of claim 8, wherein the plurality of shards comprises a shard to which more than one node is subscribed.

15. The non-transitory computer-readable data storage medium of claim 14, wherein the plurality of pairs of source nodes and target nodes comprises:
   a first pair comprising a first source node and a first target node that are both subscribed to a first shard; and
   a second pair comprising the first source node and a different, second target node that are both subscribed to the first shard,
   wherein both the first and second target nodes are updated from the first source node with respect to the first shard.

16. A database management system comprising:
   a cluster of nodes over which a columnar database has been sharded into a plurality of shards to which the nodes are subscribed;
   a plurality of source nodes of the cluster storing up-to-date metadata objects for the shards;
   a plurality of target nodes of the cluster storing out-of-date metadata objects for the shards; and
   a coordinator node to initiate a parallel batch metadata transfer update process in which the out-of-date metadata objects at the target nodes are updated in parallel from the up-to-date metadata objects at the source nodes.

17. The database management system of claim 16, wherein the out-of-date metadata objects are updated in parallel from the up-to-date metadata objects within one commit lock of the cluster.

18. The database management system of claim 16, wherein the coordinator node is to determine a plurality of pairs of source nodes and target nodes, each pair comprising one of the source nodes and one of the target nodes, the source node and the target node of each pair storing metadata objects for a same shard, the out-of-date metadata object of the target node of each pair updated from the up-to-date metadata object of the source node of the pair.

19. The database management system of claim 16, wherein the source nodes comprise a first source node storing an up-to-date metadata object for a first shard and a different, second source node storing an up-to-date metadata object for a second shard,
   wherein the target nodes comprise a first target node having an out-of-date metadata object for each of the first and second shards,
   and wherein the out-of-date metadata object for the first shard at the first target node is updated from the up-to-date metadata object at the first source node and the out-of-date metadata object for the second shard at the first target node is updated from the up-to-date metadata object at the second source node in parallel.

20. The database management system of claim 16, wherein the source nodes comprise a first source node storing an up-to-date metadata object for a first shard,
   wherein the target nodes comprise a first target node having an out-of-date metadata object for the first shard and a second target node having an out-of-date metadata object for the first shard,
   and wherein the out-of-date metadata object at the first target node and the out-of-date metadata object at the second target node are both updated in parallel from the up-to-date metadata object at the first source node.

* * * * *